United States Patent [19]
Holmes

[11] Patent Number: 5,471,035
[45] Date of Patent: Nov. 28, 1995

[54] SANDWICH CONSTRUCTION FOR CURRENT LIMITING POSITIVE TEMPERATURE COEFFICIENT PROTECTIVE DEVICE

[75] Inventor: Francis A. Holmes, Hendersonville, N.C.

[73] Assignee: Eaton Corporation, Cleveland, Ohio

[21] Appl. No.: 139,679

[22] Filed: Oct. 22, 1993

[51] Int. Cl.$^6$ ........................................................ H05B 1/02
[52] U.S. Cl. .......................... 219/505; 219/481; 219/202
[58] Field of Search ........................................ 219/504, 505, 219/202, 481, 483–486; 361/106, 27, 24

[56] References Cited

U.S. PATENT DOCUMENTS

| | | | |
|---|---|---|---|
| 4,316,080 | 2/1982 | Wroblewski | 219/505 |
| 4,545,926 | 10/1985 | Fouts, Jr. et al. | 252/511 |
| 4,560,498 | 12/1985 | Horsma et al. | 252/511 |
| 4,775,778 | 10/1988 | van Konynenburg et al. | 219/549 |
| 4,780,598 | 10/1988 | Fahey et al. | 219/511 |
| 5,064,997 | 11/1991 | Fang et al. | 219/505 |

OTHER PUBLICATIONS

PTC Application Notes, Keystone Carbon Company Bulletin T-929, pp. 34–42.

*Primary Examiner*—Teresa J. Walberg
*Assistant Examiner*—Sam Paik
*Attorney, Agent, or Firm*—Martin J. Moran

[57] ABSTRACT

A self-protecting current limiting positive temperature coefficient (PTC) resistive element arrangement protects a load circuit coupled to a power line via an actuator. Two or more PTC sections having temperature sensitive resistances are thermally coupled and electrically insulated. The PTC sections have low electrical resistance at low temperature. At least a first of the PTC sections is in series with the load and is resistively heated by excessive load current. At least one other section, thermally coupled to the first, controls the actuator by the change in its resistance induced by heat from the first section. In a three phase embodiment, five PTC sections are stacked. The first, third and fifth sections are in series with the power line phases and the load. A current fault causes excessive current flow to the load circuit, heating and increasing the resistance of the first, third and/or fifth PTC sections. This tends to block current flow by increasing the resistance across the power line, and shifts the voltage drop from the load circuit to the protective PTC. The second and fourth interleaved current limiting PTC sections are heated by conduction. The second and fourth PTC sections are electrically coupled to control the motor starter or other actuator. Load current responsive heating of any of the first, third or fifth sections increases the internal resistance of the second and/or fourth sections by thermal conduction, causing a transition of the second and/or fourth sections into the high resistance state to disable the actuator and protect against further heating.

16 Claims, 2 Drawing Sheets

SANDWICH CONSTRUCTION FOR CURRENT LIMITING POSITIVE TEMPERATURE COEFFICIENT PROTECTIVE DEVICE

BACKGROUND OF THE INVENTION

1. Field of the Invention

The invention relates to the field of reusable fuses derived from positive temperature coefficient (PTC) resistive sections arranged for protecting electrical power distribution systems and loads coupled thereto. In particular, the invention concerns a sandwich arrangement of thermally engaged current limiting PTC sections in series with a load such as a motor and controlling a load actuator such as a motor starter, whereby the current limiting polymer is protected from excessive power dissipation.

2. Prior Art

Positive temperature coefficient (PTC) resistive elements are known and are known to be used as reusable fuses. A PTC resistive element exhibits a relatively low resistance to a flow of electrical current when the current is below a threshold value. Current above the threshold value flowing through the PTC causes resistive heating of the PTC element. A rise in internal temperature of a PTC element to above a transition temperature causes the PTC element to transition into a state of high resistance, thereby limiting current flow through the PTC element and the circuit containing it.

As stated in PTC Application Notes, Keystone Carbon Company Bulletin T-929, P.37, "[t]he dramatic rise in resistance of a PTC at the transition temperature makes it an ideal candidate for current limiting applications. For currents below the limiting current ($1_L$), the power being generated in the unit is insufficient to heat the PTC to its transition temperature. However, when abnormally high-fault currents flow, the resistance of the PTC increases at such a rapid rate that any further increase in power dissipation results in a reduction in current."

Examples of PTC resistive devices include silicon carbide, tungsten, polycrystalline ceramic barium titanate or barium and strontium titanate and current limiting conductive polymers.

Current limiting conductive polymers are known in the art to be useful for limiting electrical current. For example, Raychem Corporation manufactures and markets a current limiting polymer under the trademark Polyswitch™. Current limiting polymers having PTC characteristics are disclosed in U.S. Pat. No. 4,545,926; 4,560,498 and 4,775,778, all owned by Raychem Corporation. Current limiting polymers typically comprise cross-linked polyethylene, heavily doped with carbon. PTC's typically have a low electrical resistance when conducting current below a threshold value, i.e., when the PTC is relatively cool. When current flowing through the PTC exceeds the threshold, resistive heating produces a rise in the internal temperature of the PTC, causing a reduction in conductivity, i.e, an increase in electrical resistance. The power dissipated in the PTC is proportional to the resistance multiplied by the square of the current, therefore an increase in resistance leads to a further increase of resistance. The change in resistance thus is quite rapid. Typically, the increase in resistance is virtually a step function once the magnitude of the current (and the resulting internal temperature of the polymer) surpasses the threshold value.

The change in resistance of a PTC upon passing the threshold is quite large. For example, the resistance of a current limiting polymer upon passing the threshold may increase by a factor of 1,000 to 4,000. Assuming the PTC is in a power system in series with a load, the increase in resistance of the PTC increases the total load resistance seen by the power line and substantially reduces the current. However, the increase in resistance of the PTC produces a corresponding increase in the voltage drop across the PTC and a decrease in the voltage drop across the load. Thus, a larger portion of the power from the line is dissipated in the PTC as heat, as opposed to being dissipated by the load. Depending on the application (i.e., the line voltage and the load resistance), the voltage drop across a PTC which has transitioned to its high resistance state could be substantial, and could result in destruction of the PTC. This is especially true when a conductive polymer is used as the PTC. Furthermore, PTC's are known to exhibit negative temperature coefficient (NTC) resistance characteristics if the internal temperature of the PTC goes much beyond the threshold level. If heated to the NTC level, the resistance of the PTC decreases.

A relatively large PTC section can be used to improve the ability of the PTC to dissipate heat. However, generally the PTC material is relatively expensive, and this approach may require the use of a large amount of PTC material to provide adequate power dissipating capacity. The extra material will increase the bulk of the PTC and decrease the ease of installing the PTC in the circuit for use as a reusable fuse.

Placing a PTC in thermal communication with a heat producing component is known in the art. Such an arrangement is disclosed in U.S. Pat. Nos. 4,780,598 and 5,064,997, both owned by Raychem Corporation. As disclosed in U.S. Pat. Nos. 4,780,598 and 5,064,997, the heat producing component is a voltage-dependent resistor. The voltage-dependent resistor and the PTC are electrically coupled in a series circuit with components to be protected from excessive current flow. The heat producing component radiates heat to the PTC to accelerate its transition into a state of high resistance to protect the other circuit components. No provision is made to decouple power from the PTC or heat producing component once the transition occurs. The PTC, therefore, is subject to destruction from excessive power dissipation. Furthermore, neither of U.S. Pat. Nos. 4,780,598 or 5,064,997 discloses disposing PTC elements coupled in separate but related circuits in an abutting, thermally communicating relationship wherein excessive heat generating current in one circuit produces a reaction in the other circuit.

There is a need, therefore, for a current limiting device that takes advantage of the beneficial aspects of a current limiting PTC for protecting a line or load from overcurrent conditions with a reduced risk that the PTC will be destroyed by heat dissipation from the increase in voltage drop across the PTC that is inherent in its operation. Advantageously, this should be accomplished without requiring a substantial increase in the amount of PTC used in the circuit, to minimize the expense of the protective device.

SUMMARY OF THE INVENTION

It is an object of the invention to provide a device for inserting a resistance in series with a,power line for substantially limiting current flow when an over-current situation occurs.

It is another object of the invention to provide a load current limiting device constructed of a PTC resistance material in a manner providing greatly increased electrical resistance promptly upon occurrence of excessive current, but which is less prone to destruction from the increase in voltage across the PTC material that occurs due to the increase in its resistance.

It is another object of the invention to prevent an overvoltage condition across a current limiting polymer by terminating power to an actuator controlling activation of a current drawing load.

These and other objects are satisfied according to the invention by a plurality of PTC sections in thermal communication, arranged such that power dissipation in at least one of the sections carrying load current heats at least one other of the sections by thermal transfer. This heated other section is coupled to means responsive to the change in its resistance to decouple the load, thereby functioning as a control section. The load and control sections preferably are electrically insulated, for example via a thin strip of electrically insulating, thermally conducting material disposed between essentially abutting sections of the PTC material.

In one embodiment of the invention, the device comprises three abutting PTC sections arranged in a sandwich. An electrical insulating, thermally conductive shim is disposed between the first and second sections and between the second and third sections. The device is coupled to a load such that the two outer sections of the sandwich are each in series with one of two conductors coupling the power line to the load, e.g., a single phase winding of a motor. The load has an actuator such as a motor starter that applies power to the load only when the actuator is powered or has an appropriate input signal level. Current to power the actuator is routed through the control section of the PTC material, or the signal enabling the actuator is developed as a function of the resistance of the control section of the PTC material. Therefore, when the load current in the windings exceeds the threshold current of the PTC material, e.g., due to an overload, short circuit or ground fault on the load side of the protective device, the load sections of the PTC material heat the control section. The resistance of the control section is thereby increased and the actuator drops out, thereby decoupling the load from the line and protecting the PTC from further heating.

According to this embodiment, the power and return conductors of the power line are wired through the first and third current limiting PTC sections to the two terminals of a single phase load or the like. In this manner, the first and third current limiting PTC sections are both coupled in series with the power source and the load, and heat the second section between them.

The second PTC section, namely the control section, is wired in series with an actuating power source. The actuating power source need not be the same power source as the line. The coil of a motor starter or an input of a solid state starter arrangement comprising a comparator or the like can form the actuator input that is controlled according to the invention.

When switching power to the load, power is applied from the actuating power source to the actuator through the PTC section. The actuating power source for the actuator can be the power line, for example with switch means for the actuator input wired between the actuating power source and the second PTC section, between the second PTC section and the actuator, or between the actuator and the actuating power source return. In any event, current for the actuator input is applied from the actuating power source through the second current limiting PTC section. Energizing the actuator enables the motor or other load to run. The motor draws current from the load power source through the first current limiting PTC section. Motor current also flows on the return side through the third current limiting PTC section.

Assuming that conditions are nominal and current drawn through each of the current limiting PTC sections is below a threshold level that would trigger an increase in the input resistance of the respective PTC sections, the protective device has minimal effect in that the resistance of the respective sections is low enough that little power or heat is dissipated. Under such normal conditions, the majority of the voltage of the power line is applied to the load (e.g., motor winding) and only a small amount of voltage drop is measurable across the first and third current limiting PTC sections. In the event of a load malfunction, such as an overload or short circuit on the load side of the protective device, the circuit begins to draw high current from the line, through the PTC material. The excessive load current, above a threshold value, causes an increase in the internal temperature of the first and third PTC sections. The internal temperature rise of these sections results in a substantial increase in the resistance of the PTC sections. For example, when using a current limiting conductive polymer as the PTC material, the polymer is known to increase 1,000 to 4,000 times its nominal resistance value. This resistance is inserted in series with the line by the inherent operation of the conductive polymer. The increased resistance limits the flow of current into the load circuit, but also shifts the voltage drop from the load device to the protective device.

A short circuit obviously shunts the resistance of the load, leaving only the resistance of the conductors and the protective device across the line. Fault conditions such as a mechanical over-load of a motor generally also involve a decrease in the resistance of the load. These situations also shift the voltage of the line from the load to the protective device. Sustained application of the large voltage drop across the PTC device may destroy the PTC device. However, by operation of the protective device according to the invention, heat energy dissipated in the first and third PTC sections is thermally conducted to the second PTC section sandwiched between the first and third PTC sections and acting as the control resistance. The rise in temperature in the second current limiting PTC section due to the transfer of heat from the first and third current limiting PTC sections increases its resistance, which change can be sensed or used directly to disable the activation means that couples the load to the line, thereby stopping further current flow. With the cessation of current, the line voltage remains coupled to the first and third current limiting PTC sections, but there is no voltage drop and no heat is dissipated. In this manner, the circuit is protected and the protective current limiting PTC device remains intact and can be reused once the circuit fault is analyzed and corrected.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings:

DETAILED DESCRIPTION OF THE PREFERRED EMBODIMENTS

The invention comprises an arrangement of current limiting Positive Temperature-Coefficient (PTC) resistive sections for protecting electrical lines and loads from excessive current, that also functions to protect the current limiting PTC sections from damage due to heat dissipation. This is arranged by arranging two or more sections of the current limiting PTC sections in thermal contact and electrical isolation, using one or more of the sections as current sensitive resistances in series with the load, and using another section heated by the first one to operate a control for disengaging the line and load. Preferably, the respective sections of the current limiting PTC are sandwiched.

The invention can be carried out using any number of PTC resistive devices, including silicon carbide, tungsten, polycrystalline ceramic barium titanate or barium and strontium titanate etc. In general PTC resistive elements are well known in the art. Current limiting conductive polymers are perhaps the type of PTC best suited for use in this invention because of the great increase in resistance they exhibit when they transition to a state of high resistance and because the polymers are pliable and therefore are easily placed in a good thermally conducting, abutting orientation with one another.

Figure 1:
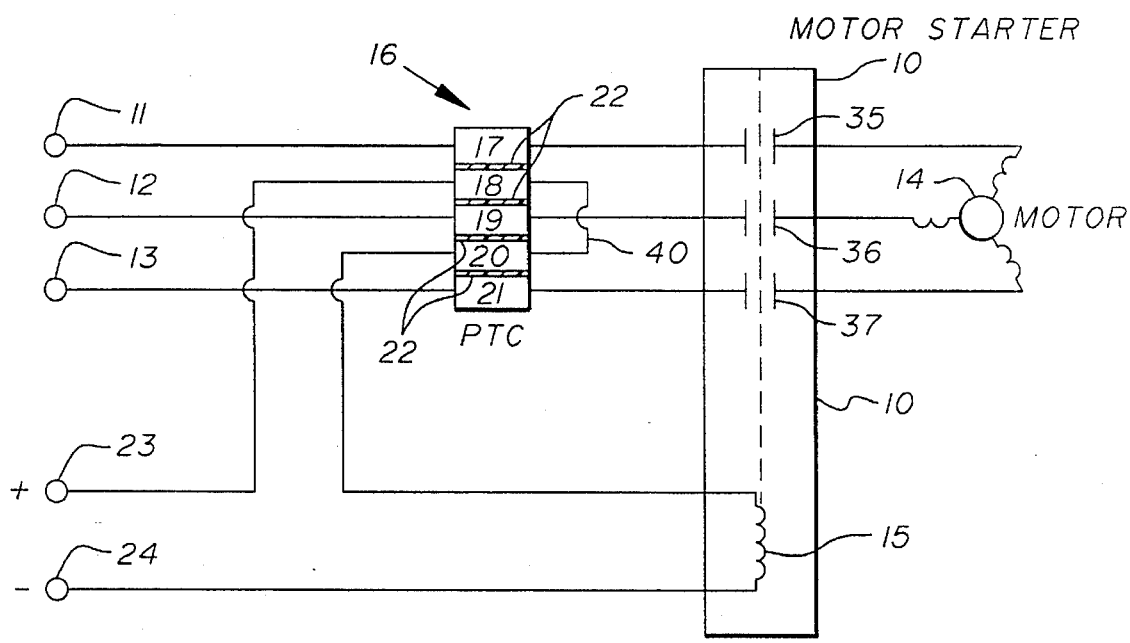
FIG. 1 is a schematic of the invention in a 3-phase power application.

According to an inventive aspect, this arrangement is applied according to the embodiment shown in FIG. 1 to protect a 3-phase line and load, such as a motor 14, from excessive current such as would result from an internal short circuit in the motor. As shown in FIG. 1, 3-phase power to motor 14 is applied at lines 11, 12 and 13. Activation of 3-phase motors typically is accomplished by energizing a motor starter, which can be represented generally as a coil and associated relay contacts. In this case, three-phase motor 14 is activated by motor starter 10 having coil 15 and related contacts 35, 36 and 37. The actuation signal for closing the contacts and energizing motor starter coil 15 is continuous for maintaining contacts 35, 36 and 37 closed, thereby coupling motor 14 to three-phase power lines 11, 12 and 13.

All of the power to motor 14 and motor starter coil 15 passes through current limiting PTC sandwich 16. Current limiting PTC sandwich 16 comprises a plurality of electrically isolated, thermally coupled separate current limiting PTC sections 17–21. Current limiting PTC sections 17–21 are disposed in an essentially abutting relationship, such as in a stack or in a row on a horizontal plane. Shims 22, which are electrically insulating but thermally conductive are disposed between each of the current limiting PTC sections. Shims 22 are electrically non-conductive to avoid leakage of power from the 3-phase load section including power lines 11, 12, 13 and motor 14 to the control section including starter 10 and actuating power inputs and conductors 23 and 24. Shims 22 are thermally conductive for reasons explained below.

Motor 14 is coupled to power through contacts 35, 36 and 37. Contacts 35, 36 and 37 are closed by energizing coil 15. Power to motor starter coil 15 is applied at terminals 23 and 24. Power to motor starter coil 15 passes through current limiting PTC section 18. Current limiting PTC section 18 and current limiting PTC section 20 are electrically coupled via jumper 40. Therefore, power to motor starter coil 15 passes through current limiting PTC sections 18 and 20 to motor starter coil 15. An opposite end of motor starter coil 15 is coupled to a power return. In this manner, current limiting PTC section 18, current limiting PTC section 20 and motor starter coil 15 are coupled in series across a control power source.

After application of power to motor starter coil 15, motor 14 is coupled to and begins drawing power from the 3-phase power source. Lines 11, 12 and 13 of the 3-phase power source are coupled to current limiting PTC sections 17, 19 and 21, respectively. An opposite end of each respective current limiting PTC section 17, 19 and 21 is coupled to a winding of motor 14. Power from the three-phase power source flows through current limiting PTC sections 17, 19 and 21 respectively, to motor 14.

During normal operation, the resistances of current limiting PTC sections 17–21 remain relatively low. Furthermore, since the resistance is low, the power line voltage drops across the current limiting PTC sections also are relatively low. As with most conductors, an increase in current passing through the current limiting PTC sections causes a related rise in the internal temperature of the current limiting PTC sections. When the internal temperature of a current limiting PTC section is increased above a threshold that is a characteristic Of the PTC composition and dimensions, the resistance of the current limiting PTC section increases substantially. The resistance of conductive polymers will increase by a factor of 1,000 to 4,000 once the internal temperature of the current limiting polymer exceeds the threshold level. Therefore, current limiting polymers are exceptionally useful as reusable fuses to protect loads and the like from exposure to excessive amounts of current. However, upon transition to a high resistance state, the voltage drop across a current limiting polymer or any other PTC substantially increases. Prolonged exposure to the high voltage shortens the useful life of the current limiting PTC and adversely affects the characteristics of the current limiting PTC. Too long an exposure may render it useless as a reusable fuse due to structural damage.

The invention, however, provides a safety feature for the current limiting PTC. For example, assuming that during operation, the load circuit begins drawing excessive current because of a short circuit, overload, ground fault, wiring error or the like, the current flows along lines 11, 12 and/or 13. If all the lines carry excessive current, the internal temperature of current limiting PTC sections 17, 19 and 21 increases due to the high current flow through the current limiting PTC sections. Eventually, current limiting PTC sections 17, 19 and 21 will reach an internal temperature over the threshold at which the current limiting PTC sections transition into a high resistance state. The transition into the high resistance state reduces current to the load circuit, thereby preventing damage.

During normal operation, the majority of the voltage drop in the system is across the load, i.e., motor 14. Upon the transition into the high resistance state of current limiting PTC sections 17, 19 and 21, the majority of the voltage drop occurs across the current limiting PTC sections, especially if a short circuit shunts all current past the motor windings. Prolonged exposure to an excessive voltage drop across current limiting PTC sections 17, 19 and 21 will eventually destroy the effectiveness of the current limiting PTC sections as reusable fuses. However, in the invention, heat generated in current limiting PTC sections 17, 19 and 21 is thermally coupled by conduction and radiation into the current limiting PTC sections 18 and/or 20, which are in the control circuit. Enough heat is conducted and radiated from the current limiting PTC sections in the power circuit, namely current limiting PTC sections 17, 19 and 21, into current limiting PTC sections 18 and/or 20, to cause a rise in internal temperature of current limiting PTC sections 18 and/or 20 above its threshold level at which resistance increases substantially. Current limiting PTC sections 18 and/or 20 thus transition into a high resistance state, blocking or substantially reducing application of power to motor starter coil 15 sufficient to keep the contacts engaged. Removal of power from motor starter coil 15 opens contacts 35, 36 and 37, decoupling the load circuit including motor 14 from power lines 11, 12 and 13. Decoupling the load circuit relieves the voltage drop across current limiting PTC sections 17, 19 and 21, preventing destruction of the current limiting PTC sections from what would otherwise be a prolonged exposure to an excessive voltage. The activating power applied at terminals 23 and 24 can be relatively low, so that the voltage drop which develops across current limiting PTC sections 18 and/or 20 when these sections transition to a high resistance state is not of a magnitude which would damage current limiting PTC sections 18 and/or 20. Additionally, the device is applicable to a control circuit that includes other current limiting features.

Figure 2:
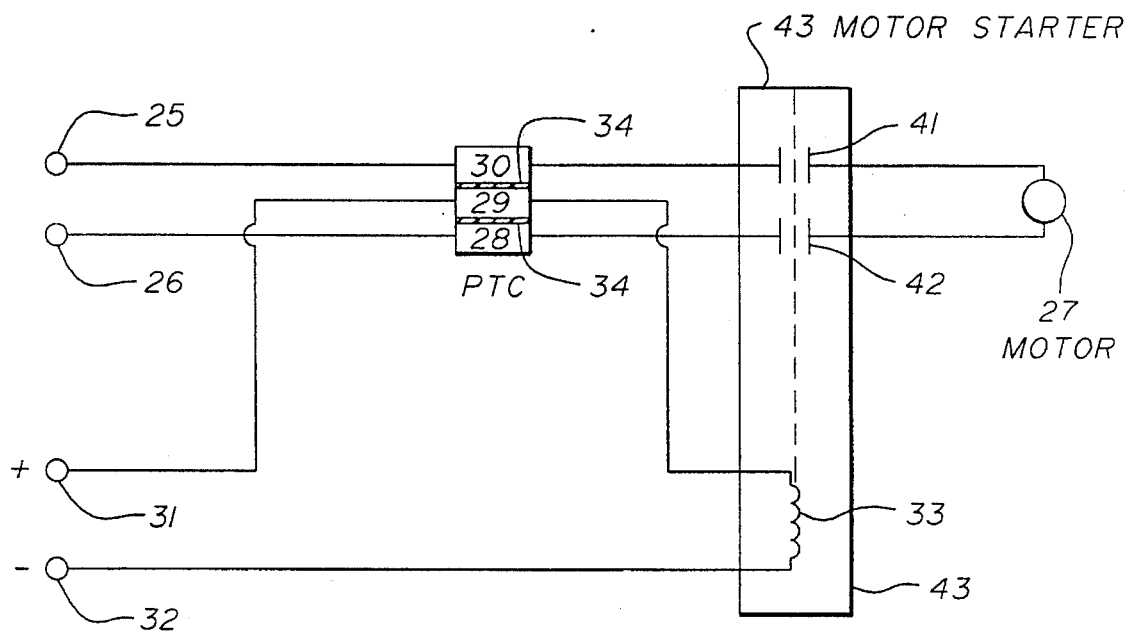
FIG. 2 is a schematic of the invention in a single phase power application.

FIG. 2 is a schematic showing use of the invention with a single phase load. A power source is coupled across terminals 25 and 26 for powering a load, such as motor 27. Terminal 25 is coupled to one side of current limiting PTC section 28. An opposite side of current limiting PTC section 28 is coupled through contact 41 to motor 27. Current limiting PTC section 30 is coupled on one side to power return terminal 26, and on the opposite side to a return end of motor 27 through contact 42.

Contacts 41 and 42 are part of a relay or motor starter 43. Motor starter 43 comprises a coil 33 for closing contacts 41 and 42. Motor starter 43 is part of a control section which also includes current limiting PTC section 29 and a power source applied at terminals 31 and 32. Control power terminal 31 is coupled to an end of current limiting PTC section 29. An opposite end of current limiting PTC section 29 is coupled to coil 33. Current limiting PTC sections 28–30 are stacked or arrayed in an abutting relationship, and have an electrically insulating, heat conductive shim 34 disposed between the current limiting PTC sections.

Operation of the device depicted in FIG. 2 is similar to that depicted in FIG. 1 and discussed above. For example, an overload or fault in the load circuit, e.g., in motor 27, causes excessive current to be drawn through current limiting PTC sections 28 and 30. The excessive current through current limiting PTC sections 28 and 30 causes a consequent rise in the internal temperature of the current limiting PTC sections. When the internal temperature of current limiting PTC sections 28 or 30 rises above a threshold level, the input resistance of the current limiting PTCs sections 28 or 30 substantially increases, by a factor of 1,000 to 4,000 times its nominal value. The increase in input resistance of current limiting PTC sections 28 and 30 blocks current flow through motor 27, thereby preventing damage to motor 27 from the overcurrent condition, which can be due to a short circuit, overload, wiring error, ground fault or the like.

The increase in internal temperature of current limiting PTC sections 28 and/or 30 causes dissipation of heat in the sections, some of which is absorbed by current limiting PTC section 29 due to thermal conduction and radiation. Enough heat is absorbed by current limiting PTC section 29 to raise the internal temperature of current limiting PTC section 29 to above a threshold value which triggers current limiting PTC section 29 to transition to a high resistance state. The high resistance state of current limiting PTC section 29 substantially limits or blocks the current flowing through coil 33, thereby causing contacts 41 and 42 to open. Opening of contacts 41 and 42 decouples motor 27 from the power source connected across terminals 25 and 26, thereby eliminating the voltage drop across current limiting PTC sections 28 and 30. The elimination of the voltage drop across current limiting PTC sections 28 and 30 prevents destruction of these current limiting PTC sections, allowing their reuse as fuses to prevent excessive current flow into load 27 during subsequent fault conditions. There is no danger of overloading current limiting PTC section 29 because of the low power requirements of load activation coil 33.

Figure 3:
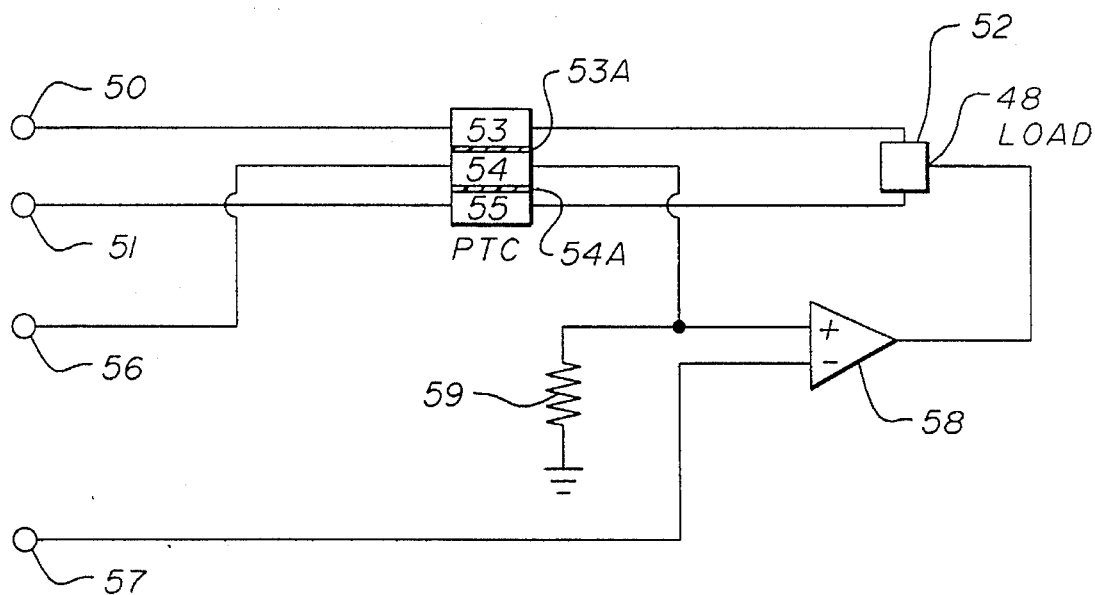
FIG. 3 is a schematic of the invention used with a solid-state activating device.

FIG. 3 is a schematic showing the invention used with a solid-state activating device that is driven from a signal input. In the load section, a power source is applied across terminals 50 and 51 for driving load 52. Current limiting PTC sections 53 and 55 with interposed shims 53A and 54A are disposed in series between, respectively, terminal 50 and load 52 and terminal 51 and load 52. In the embodiment shown, load 52 is activated by presence of a "high" signal or digital 1 at activating input 48. However, load 52 can be one which is responsive to a "low" signal or digital 0 at activating input 48.

The control circuit comprises terminals 56 and 57, current limiting PTC section 54, comparator 58 and resistor 59. Different positive voltage levels are maintained at terminals 56 and 57. For example, +10VDC can be maintained at terminal 56 and +5VDC at terminal 57. In normal operation, current limiting PTC section 54 exhibits low resistance. Therefore, there is a low voltage drop across current limiting polymer section 54. A majority of the voltage drop in the circuit defined by terminal 56, current limiting PTC section 54 and resistor 59 during normal operation appears across resistor 59. In this manner, the voltage at the non-inverting input of comparator 58 is maintained above the voltage applied to the inverting input of comparator 58 at terminal 57. Comparator 58 outputs a "high" or digital 1 to activating input 48 which engages load 52 to the power line. During activation of load 52, load 52 draws current from the power source coupled across terminals 50 and 51, the current flowing through current limiting PTC sections 53 and 55.

In the event of a short or similar fault involving the circuit of load 52, excess current flows through one or both of current limiting PTC sections 53 and 55. The excessive current flow through one or both of current limiting PTC sections 53 or 55 causes a related rise in internal temperature. The increase in internal temperature quickly rises to above a threshold level at which point the current limiting PTC sections transition into a high resistance state. Conductive polymers are known to increase 1000 to 4000 times their low temperature resistance value after such a transition. However, as mentioned previously, the increases in resistance of current limiting PTC sections 53 and 55 causes a related rise in the voltage drop across the current limiting PTC sections.

As with the other embodiments, the control section of the invention depicted in FIG. 3 acts to protect current limiting PTC sections 53 and 55 from prolonged exposure to an over-voltage condition. The heat generated by the aforementioned increases in internal temperature of current limiting PTC sections 53 and 55 is coupled into current limiting PTC section 54. Eventually, current limiting PTC section 54 absorbs enough heat that its own internal temperature is raised above a threshold level triggering it to transition into a state of high resistance. When this transition occurs, most of the voltage applied at terminal 56 appears across current limiting PTC section 54 rather than across resistor 59. The voltage at the non-inverting input of comparator 58 drops below the voltage on the inverting input. This turns the comparator off, i.e., switches the comparator output to a "low" or digital zero. Load 52 is decoupled when a "low" or digital zero is applied at activating input 48. The excess voltage drop at current limiting PTC sections 53 arid 55 is eliminated upon shut down of load 52. Whereas the device operates via a signal input, the relatively small voltage drop across current limiting PTC section 54, e.g., 10VDC, is not enough to cause current limiting PTC section 54 to heat up due to internally generated heat.

Figure 4:
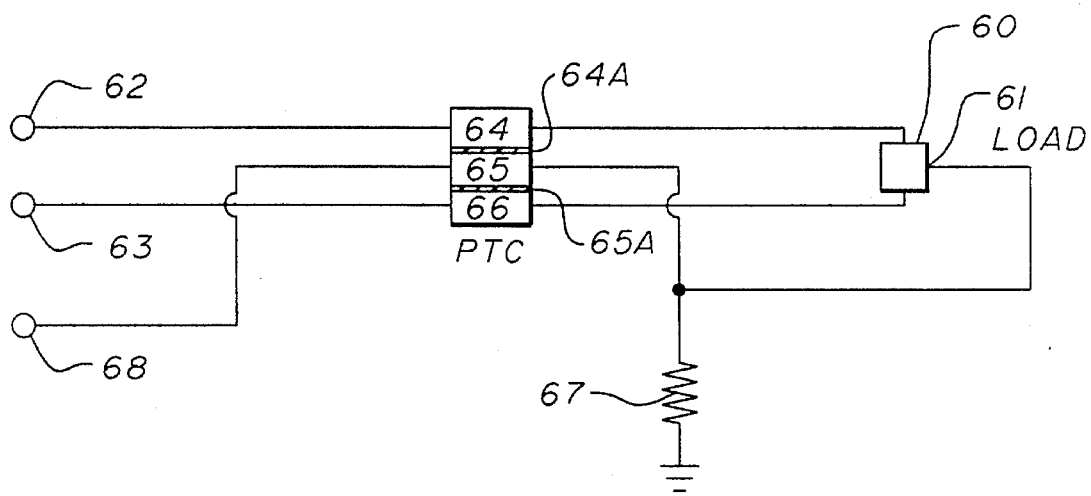
FIG. 4 is a schematic of the invention used as part of a voltage divider network.

FIG. 4 shows use of the invention as part of a voltage divider to protect and control activation of a load. Load 60 has activating input 61. Presence of an activating signal, such as a voltage above a threshold value, at input 61 activates load 60. A power source for driving load 60 is coupled across terminal 62 and 63 and delivers power to load 60 through current limiting PTC sections 64 and 66 with interposed shims 64A and 65A.

The control section of the invention depicted in FIG. 4 is coupled to a source of power at terminal 68 and has a voltage divider network comprised of current limiting PTC section 65 and resistor 67. Resistor 67 is selected with reference to the nominal resistance value of current limiting PTC section 65 so that under normal operation the majority of the voltage drop across the voltage divider network appears across resistor 67 to provide an activating signal to activating input 61. The increase in resistance of current limiting PTC section 65 due to a transfer of heat from current limiting polymer sections 64 and 66 shifts the voltage drop of the voltage divider network to across current limiting PTC section 65. The voltage drop across resistor 67 when current limiting PTC section 65 has transitioned into a high resistance state is quite low, almost negligible, whereby the activating signal to activating input 61 is removed. When the activating signal at activating input 61 is removed, load 60 turns off, removing the potentially damaging voltage drop across current limiting PTC sections 64 and 66.

The invention, having been disclosed in connection with the foregoing variations and examples, additional variations will now be apparent to persons skilled in the art. The invention is not intended to be limited to the variations specifically mentioned, and accordingly, reference should be made to the appended claims rather than the foregoing discussion of preferred examples to assess the scope of the invention in which exclusive rights have been claimed.

What I claim is:

1. A protective device for a load having an energizable load actuator to activate the load, comprising;

at least one load current limiting positive temperature coefficient resistive element section coupled in series with a power source and a load, said load current limiting positive temperature coefficient resistive element section substantially increasing in resistance upon an increase in its internal temperature to above a threshold level;

an activating electrical power source;

at least one actuator current limiting positive temperature coefficient resistive element section coupled in series with an energizable load actuator and actuating electrical power source, said at least one actuator current limiting positive temperature coefficient resistance element section substantially increasing in resistance upon an increase in its internal temperature to above a threshold level, said at least one load current limiting positive temperature coefficient resistive element section and said actuator current limiting positive temperature coefficient resistive element section placed in an abutting relationship such that increase in internal temperature of said at least one load current limiting positive temperature coefficient resistive element section to above the threshold value causes a related increase in internal temperature of said at least one actuator current limiting positive temperature coefficient resistive element section to above the threshold value thereby causing a substantial increase in resistance of said at least one actuator current limiting positive temperature coefficient resistive element section to substantially reduce current to said actuator to turn off the load.

2. The protective device of claim 1, wherein the actuator current limiting positive temperature coefficient resistive element section is sandwiched between a pair of load current limiting positive temperature coefficient resistive element sections, said pair of load current limiting positive temperature coefficient resistive element sections disposed in series with the power source and the load.

3. The protective device of claim 1, wherein the load is a motor and the load actuator is a motor starter coil.

4. The protective device of claim 1, wherein the load is a three phase load having three power input terminals, a first, a second and a third load current limiting positive temperature coefficient resistive element sections being coupled in series with a three phase power source and a respective one of said three power input terminals, first and second actuator current limiting positive temperature coefficient resistive element sections disposed between said first and second, and second and third load current limiting positive temperature coefficient resistive element sections, said actuator current limiting positive temperature coefficient resistive element sections disposed in series with the activating electrical power source and the energizable load actuator.

5. The protective device of claim 4, wherein the load is a three-phase motor and the actuator is a motor starter coil.

6. The protective device of claim 2, wherein the load current limiting positive temperature coefficient resistive element sections have first ends, coupled to the power source and the load, respectively, and second ends coupled to each other.

7. The protective device of claim 4, wherein the first, second and third current limiting positive temperature coefficient resistive element sections are coupled in series with the source of a respective phase of said three phase power source and a respective one of said three power input terminals, and said first actuator current limiting positive temperature coefficient resistive element section has a first and second end, said first end coupled to an actuator power source, said second end coupled to a second end of said second actuator current limiting positive temperature coefficient resistive element section, a first end of said second actuator current limiting positive temperature coefficient resistive element section being coupled to the load actuator.

8. The protective device of claim 1 wherein at least one of the positive temperature coefficient resistive elements is selected from the group consisting of silicon carbide, tungsten, barium titante, barium and strontium titanate or a conductive polymer.

9. A protective device for a three phase motor having a motor starter coil, comprising:

five individual, abutting current limiting positive temperature coefficient resistive element sections, any of said individual current limiting positive temperature coefficient resistive element sections substantially increasing in electrical resistance upon an increase in internal temperature of said individual current limiting positive temperature coefficient resistive element sections to above a threshold value, a first current limiting positive temperature coefficient resistive element section, a third current limiting positive temperature coefficient resistive element section and a fifth current limiting positive temperature coefficient resistive element section having power ends and opposing load ends, said power ends of said first, third and fifth current limiting positive temperature coefficient resistive element sections coupled to a respective power phase of a three-phase power wave, said load ends coupled to a motor, second and fourth current limiting positive temperature coefficient resistive element sections disposed between said first and third and said third and fifth sections, respectively, said second and fourth current limiting positive temperature coefficient resistive element sections being disposed in series with each other and with the motor starter coil, across a control power source providing motor starting current to the motor starter coil, wherein an increase in temperature of said first, third or fifth sections is transferred to at least one of said second or fourth section, thereby increasing an internal temperature of said second or fourth section to above the threshold value, thereby causing said at least one of said second or fourth section to increase substantially in resistance to substantially reduce current flow through the motor starter coil thereby turning off the motor.

10. The protective device of claim 9, wherein the current limiting positive temperature coefficient resistive element sections are arranged horizontally in a side-by-side configuration.

11. The protective device of claim 9, wherein the current limiting positive temperature coefficient resistive element sections are arranged in a vertical stack.

12. The protective device of claim 9, wherein each of said second and fourth current limiting positive temperature coefficient resistive element sections have a control end and a motor starter coil end, the control end of said second current limiting positive temperature coefficient resistive element section coupled to the control power source, the control end of said fourth current limiting positive temperature coefficient resistive element section coupled to a control power return, the motor starter coil end of said second current limiting positive temperature coefficient resistive element section coupled to a first terminal of the motor starter coil, the motor starter coil end of said fourth current limiting positive temperature coefficient resistive element section coupled to a second terminal of the motor starter coil.

13. The protective device of claim 9, wherein at least one of the positive temperature coefficient resistive elements is selected from the group consisting of silicon carbide, tungsten, barium titanate, barium and strontium titante or a conductive polymer.

14. A protective device for a load having at least one activating input for sensing an activating signal to activate the load, comprising:

at least one load current limiting positive temperature coefficient resistive element section coupled in series with a power source and the load, said load current limiting positive temperature coefficient resistive element section substantially increasing in resistance upon an increase in its internal temperature to above a threshold level;

at least one control current limiting positive temperature coefficient resistive element section coupled in series with a voltage source and the activating input of the load, said at least one control current limiting positive temperature coefficient resistive element section substantially increasing in resistance upon an increase in its internal temperature to above a threshold level, the presence of the activating voltage signal dependent on a state of resistance of the control current limiting positive temperature coefficient resistive element section, said at least one load current limiting positive temperature coefficient resistive element section and said at least one control current limiting positive temperature coefficient resistive element section placed in an abutting relationship whereby an increase in internal temperature of said at least one load current limiting positive temperature coefficient resistive element section to above the threshold level causes a related increase in internal temperature of said at least one control current limiting positive temperature coefficient resistive element section to above the threshold level thereby causing a substantial increase in resistance of said at least one control current limiting positive temperature coefficient resistive element section to substantially remove the activating voltage signal from the load.

15. The device of claim 14 further comprising a voltage comparator coupled in series between said at least one control current limiting positive temperature coefficient resistive element section and said activating input, an output of said compartor coupled to said activating input, said output of said comparator responding to voltage changes at an input caused by resistance changes in said control current limiting positive temperature coefficient resistive element section, to remove an activating signal from said activating input when said control current limiting positive temperature coefficient resistive element section has transitioned to a high resistance state.

16. The protective device, of claim 14 wherein at least one of the positive temperature coefficient resistance elements is selected from the group consisting of silicon carbide, tungsten, barium titanate, barium and strontium titanate or a conductive polymer.

\* \* \* \* \*